United States Patent
Pasko et al.

(10) Patent No.: US 9,334,052 B2
(45) Date of Patent: May 10, 2016

(54) UNMANNED AERIAL VEHICLE FLIGHT PATH DETERMINATION, OPTIMIZATION, AND MANAGEMENT

(71) Applicant: Verizon Patent and Licensing Inc., Arlington, VA (US)

(72) Inventors: Douglas M. Pasko, Bridgewater, NJ (US); Ashok N. Srivastava, Mountain View, CA (US); Hani Batla, Teaneck, NJ (US); Igor Kantor, Raleigh, NC (US); Gurpreet Ubhi, Nutley, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 28 days.

(21) Appl. No.: 14/282,163

(22) Filed: May 20, 2014

(65) Prior Publication Data
US 2015/0336668 A1 Nov. 26, 2015

(51) Int. Cl.
*G05D 1/00* (2006.01)
*G05D 3/00* (2006.01)
*G06F 7/00* (2006.01)
*G06F 17/00* (2006.01)
*B64C 39/02* (2006.01)

(52) U.S. Cl.
CPC ............... *B64C 39/024* (2013.01); *G05D 1/00* (2013.01); *G05D 1/0011* (2013.01); *B64C 2201/128* (2013.01); *B64C 2201/146* (2013.01)

(58) Field of Classification Search
CPC ............ B64C 39/024; B64C 2201/128; B64C 2201/14; B64C 2201/146; G05D 1/0011; G05D 1/0016; G05D 1/0027

USPC ................................................ 701/2, 3, 4, 14
See application file for complete search history.

(56) References Cited

U.S. PATENT DOCUMENTS 8,948,935 B1 * 2/2015 Peeters et al. ...................... 701/3
2012/0210853 A1 * 8/2012 Abershitz et al. ............. 89/1.11
(Continued)

FOREIGN PATENT DOCUMENTS

EP 2685336 A1 * 1/2014

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.
(Continued)

*Primary Examiner* — Jaime Figueroa

(57) ABSTRACT

A device receives a request for a flight path from a first location to a second location in a region. The request includes component information associated with components of UAVs in a group. The device calculates a most efficient flight path from the first location to the second location based weather information, air traffic information, obstacle information, or regulatory information associated with the region, and determines capability information for the UAVs in the group based on the component information. The device selects, from the UAVs in the group, a particular UAV that is capable of traversing the most efficient flight path based on the capability information, and generates flight path instructions for the most efficient flight path. The device provides the flight path instructions to the particular UAV to permit the particular UAV to travel from the first location to the second location via the most efficient flight path.

20 Claims, 10 Drawing Sheets

(56) References Cited

U.S. PATENT DOCUMENTS

| | | | | |
|---|---|---|---|---|
| 2014/0018976 | A1* | 1/2014 | Goossen et al. | 701/2 |
| 2014/0032034 | A1* | 1/2014 | Raptopoulos et al. | 701/25 |
| 2014/0249693 | A1* | 9/2014 | Stark et al. | 701/2 |
| 2014/0309817 | A1* | 10/2014 | Burgin et al. | 701/3 |
| 2014/0316616 | A1* | 10/2014 | Kugelmass | 701/8 |
| 2015/0158587 | A1* | 6/2015 | Patrick et al. | 701/3 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.

Park et al., "Agent Technology for Coordinating UAV Target Tracking", Knowledge-Based Intelligent Information and Engineering Systems, Springer Berlin Heidelberg, 2005, 8 pages.

Kuwata et al., "Three Dimensional Receding Horizon Control for UAVs", AIAA Guidance, Navigation, and Control Conference and Exhibit, Aug. 16-19, 2004, 14 pages.

Alighanbari et al., "Filter-Embedded UAV Task Assignment Algorithms for Dynamic Environments", AIAA Guidance, Navigation, and Control Conference and Exhibit, Aug. 16-19, 2004, 15 pages.

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", htpp:/web.mit.edu/people/jhow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optimization", Cambridge University Press, 2004, 730 pages.

* cited by examiner

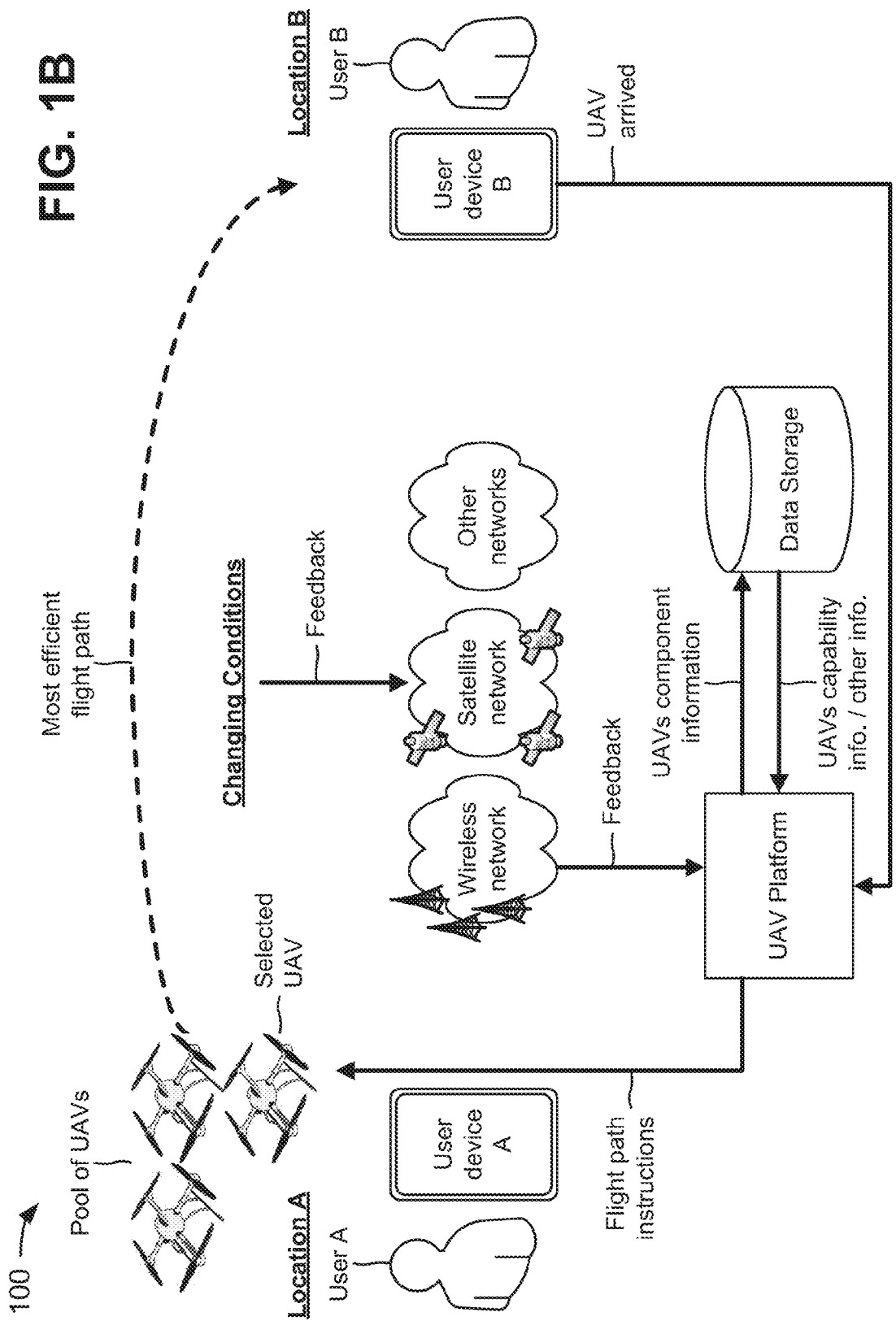

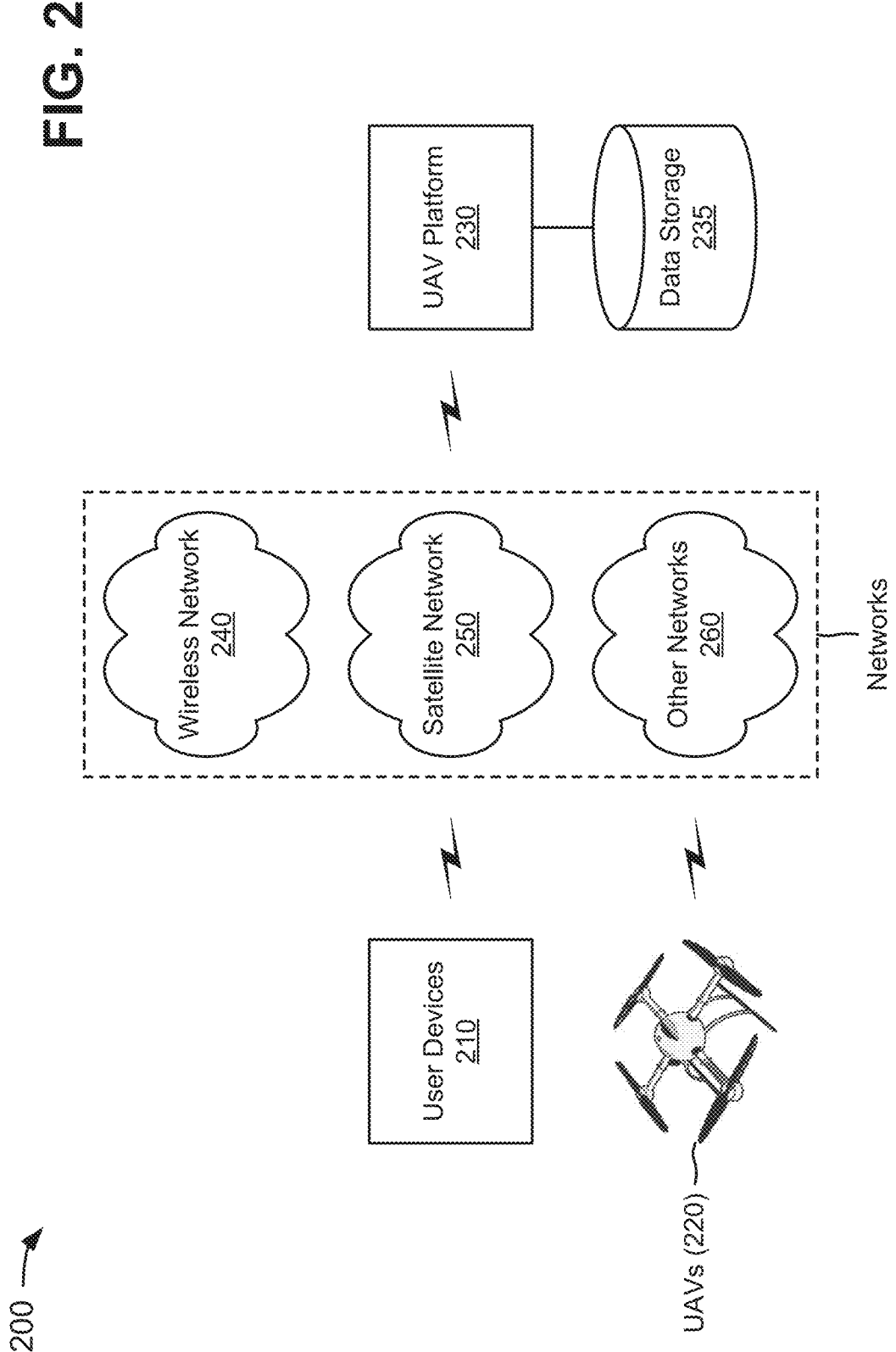

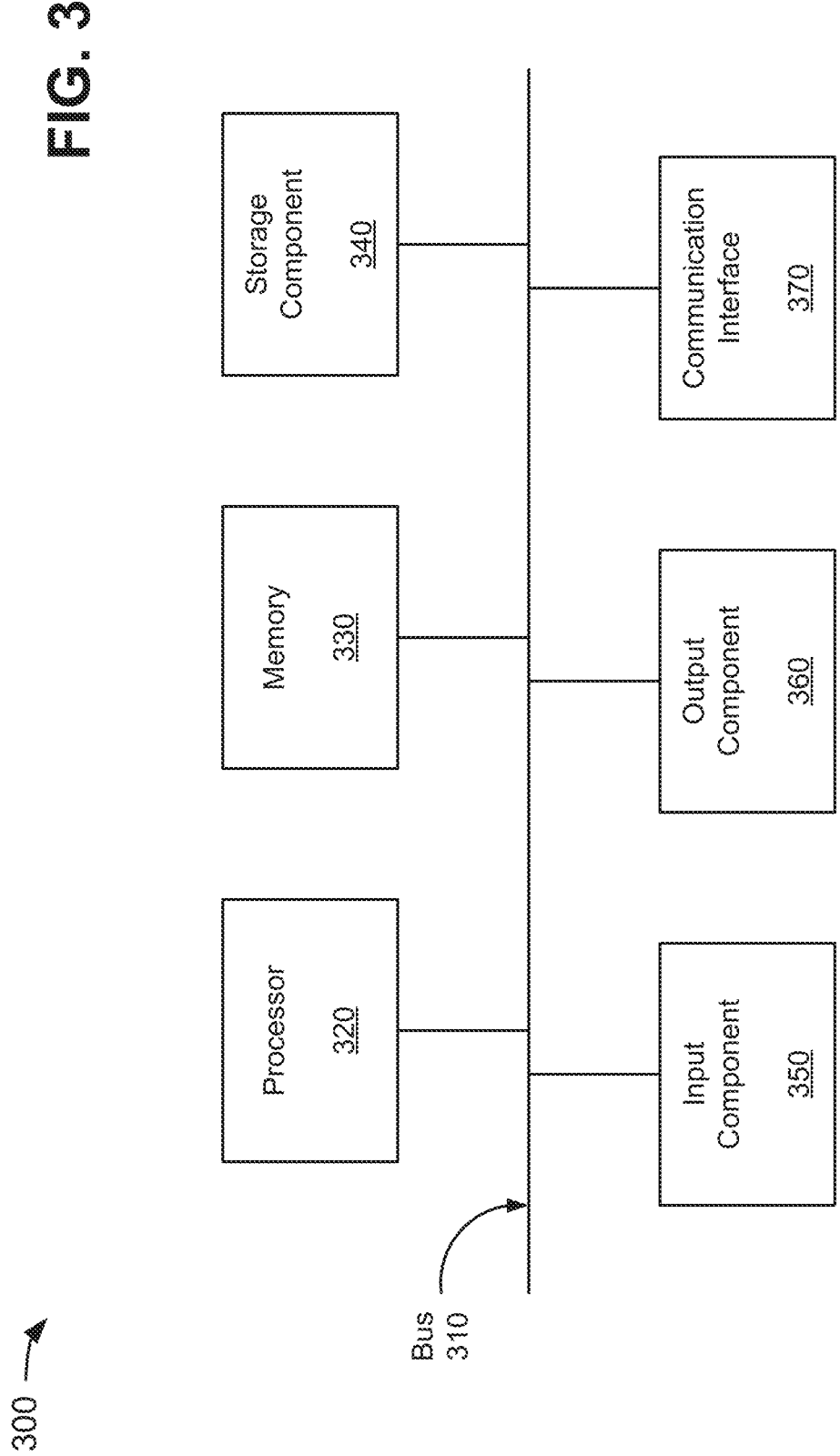

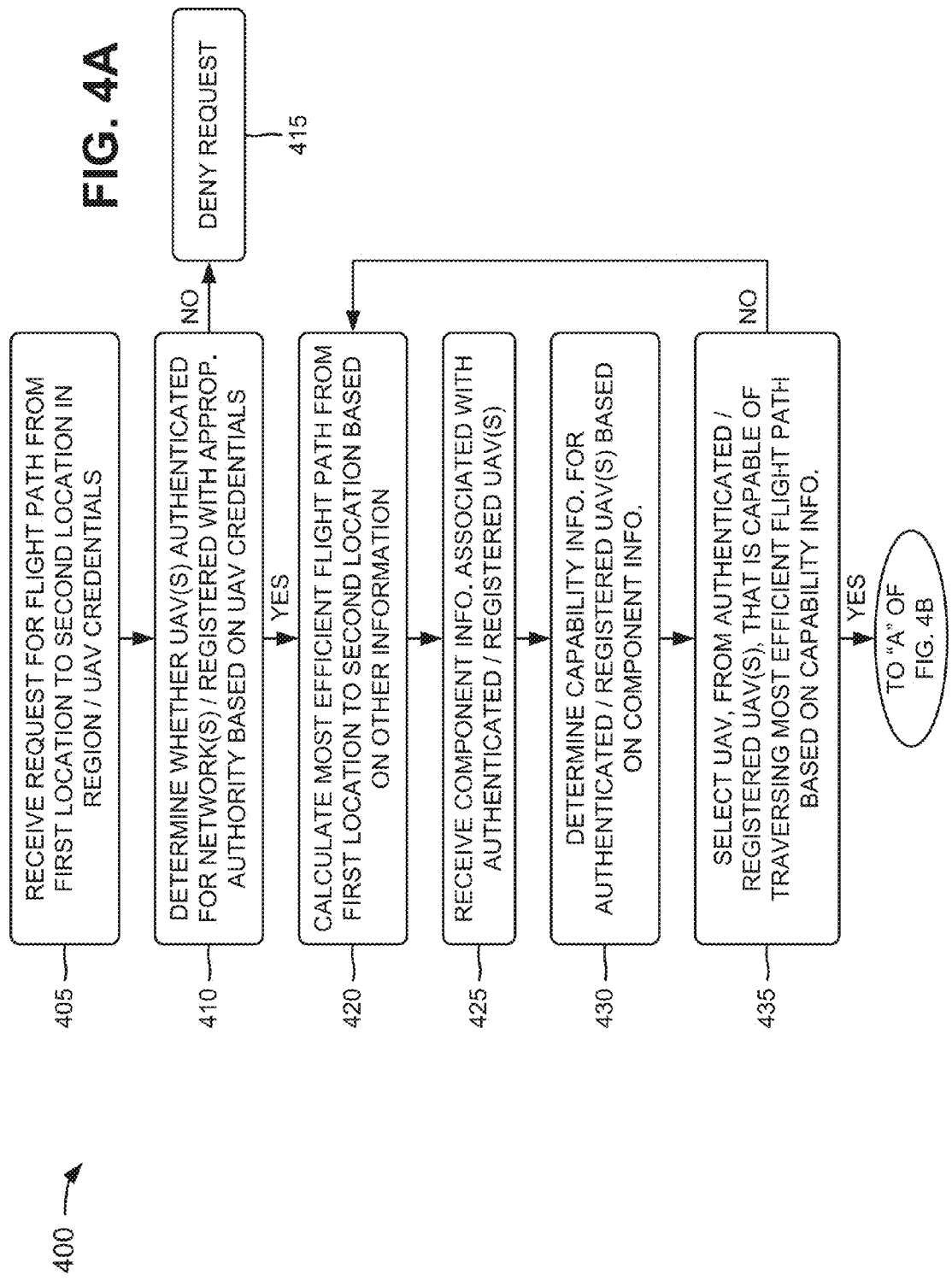

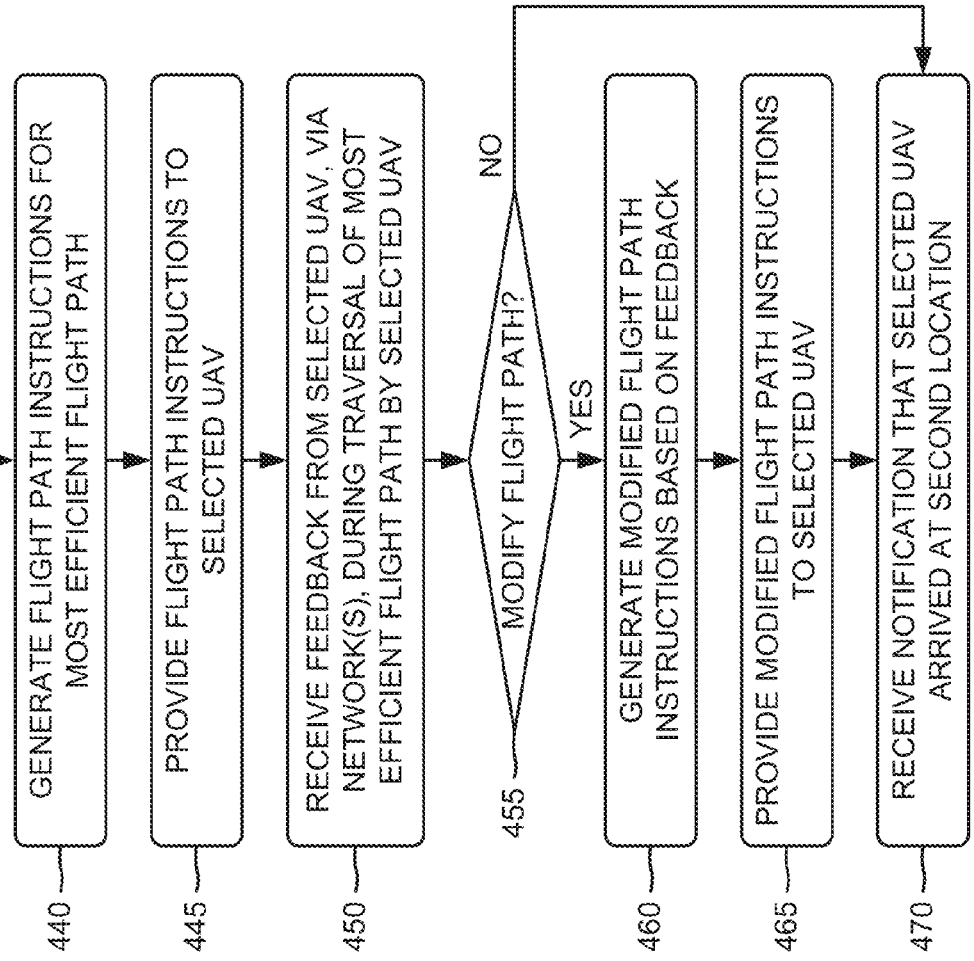

UNMANNED AERIAL VEHICLE FLIGHT PATH DETERMINATION, OPTIMIZATION, AND MANAGEMENT

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for determining, optimizing, and managing flight paths for UAVs.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
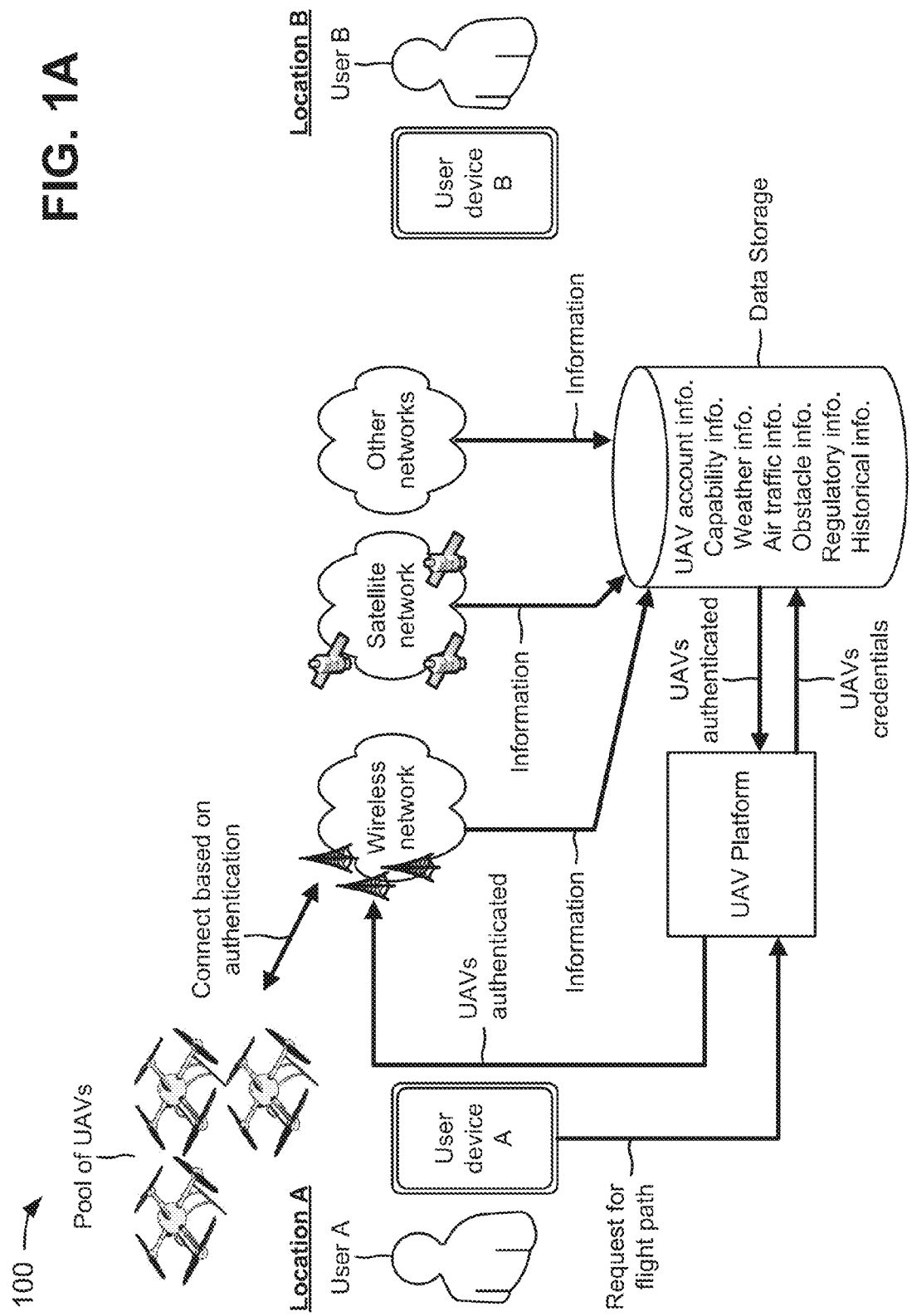

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV, selected from a pool or group of UAVs, from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with a wireless network, a satellite network, and/or other networks. The wireless network, the satellite network, and/or the other networks may provide information to the data storage, such as capability information associated with UAVs (e.g., thrusts, battery life, etc. associated with UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc.

As further shown in FIG. 1A, user A may instruct user device A to generate a request for a flight path (e.g., from location A to location B) for one of the UAVs in the pool, and to provide the request to the UAV platform. The request may include credentials (e.g., serial numbers, identifiers of universal integrated circuit cards (UICCs), etc.) associated with the UAVs in the pool. The UAV platform may utilize the UAV credentials to determine whether the UAVs in the pool are authenticated for utilizing the UAV platform and/or one or more of the networks, and are registered with an appropriate authority (e.g., a government agency) for use. For example, the UAV platform may compare the UAV credentials with UAV account information (e.g., information associated with authenticated and registered UAVs) provided in the data storage to determine whether the UAVs in the pool are authenticated. As shown in FIG. 1A, assume that the UAVs in the pool are authenticated, and that the UAV platform provides a message indicating that the UAVs in the pool are authenticated to one or more of the networks (e.g., to the wireless network). The UAVs in the pool may connect with the wireless network, the satellite network, and/or the other networks based on the authentication of the UAVs in the pool.

As shown in FIG. 1B, the UAV platform may utilize information associated with the UAVs in the pool (e.g., component information associated with components of the UAVs, the requested flight path, etc.) to identify capabilities of the UAVs in the pool and other information in the data storage. For example, the UAV platform may retrieve capability information associated with the UAVs in the pool and/or other information (e.g., the weather information, the obstacle information, the regulatory information, the historical information, etc. associated with the geographical region) from the data storage. The UAV platform may calculate flight paths from location A to location B based on the other information, and may select a most efficient flight path from the calculated flight paths. For example, based on the weather conditions, obstacles along the flight path, etc., the UAV platform may determine a first flight path that takes two hours to traverse, a second flight path that takes one hour and forty-five minutes to traverse, and a third flight path that takes two hours and fifteen minutes to traverse. In such an example, the UAV platform may select the second flight path as the most efficient flight path since the second flight path requires the shortest amount of time. In some implementations, the UAV platform may select the most efficient flight path based on distance traveled by the UAV (e.g., the UAV platform may select a flight path that requires the shortest distance), power usage by the UAV (e.g., the UAV platform may select a flight path that requires the least amount of power usage), etc.

The UAV platform may select, from the pool of UAVs, a UAV that is capable of traversing the most efficient flight path based on the capability information associated with the UAVs in the pool. If none of the UAVs in the pool of UAVs are capable of traversing the flight path, the UAV platform may select another flight path as the most efficient flight path or may deny the request for the flight path. Assuming that the UAV platform selects a UAV, in the pool of UAVs, as being capable of traversing the most efficient flight path, the UAV platform may generate flight path instructions for the most efficient flight path. For example, the flight path instructions may indicate that the selected UAV is to fly at an altitude of two-thousand (2,000) meters, for fifty (50) kilometers and fifty-five (55) minutes, in order to arrive at location B. The UAV platform may provide the flight path instructions to the selected UAV (e.g., via the wireless network), as further shown in FIG. 1B.

The selected UAV may take off from location A, and may travel the most efficient flight path based on the flight path instructions. While the selected UAV is traveling along the most efficient flight path, one or more of the networks may receive feedback from the selected UAV regarding the most efficient flight path (e.g., about changing conditions, such as speed, weather conditions, duration, etc.). The selected UAV may travel the most efficient flight path until the selected UAV arrives at location B. When the selected UAV arrives at location B, the selected UAV and/or user device B may generate a notification indicating that the selected UAV arrived safely at location B, and may provide the notification to the UAV platform.

Systems and/or methods described herein may provide a platform that enables UAVs to safely traverse flight paths from origination locations to destination locations. The systems and/or methods may enable the platform to determine the most efficient flight paths from origination locations to destination locations, and to select the optimal UAVs to traverse the most efficient flight paths. The systems and/or methods may also provide assurance that UAVs successfully and safely traverse the most efficient flight paths.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; generate one or more flight paths for UAV 220, etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

In some implementations, UAV 220 may be controlled by UAV platform 230 via communications with UAV platform 230. Additionally, or alternatively, UAV 220 may be controlled by the computational resources of UAV 220. Additionally, or alternatively, UAV 220 may be controlled by the computational resources of UAV 220. Additionally, or alternatively, UAV 220 may controlled by another UAV 220 via communications with the other UAV 220. Additionally, or alternatively, UAV 220 may be controlled by a combination of UAV platform 230, the computational resources of UAV 220, and/or the other UAV 220.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc. In some implementations, UAV platform 230 may receive, from user device 210, a request for a flight path from an origination location to a destination location, and credentials associated with a pool of UAVs 220. UAV platform 230 may authenticate the pool of UAVs 220 for use of UAV platform 230 and/or networks 240-260 based on the credentials. UAV platform 230 may calculate a most efficient flight path from the origination location to the destination location based on other information (e.g., weather information, air traffic information, etc.), and may receive component information from the authenticated UAVs 220 in the pool. UAV platform 230 may determine capability information for the authenticated UAVs 220 in the pool based on the component information, and may select, from the authenticated UAVs 220, a particular UAV 220 that is capable of traversing the most efficient flight path based on the capability information. UAV platform 230 may generate flight path instructions for the most efficient flight path, and may provide the flight path instructions to the particular UAV 220. UAV platform 230 may receive feedback from the particular UAV 220, via networks 240-260, during traversal of the most efficient flight path by the particular UAV 220. UAV platform 230 may modify the flight path instructions based on the feedback, and may provide the modified flight path instructions to the particular UAV 220. UAV platform 230 may receive a notification that the particular UAV 220 arrived at the location when particular UAV 220 lands at the location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A and 4B depict a flow chart of an example process 400 for determining, optimizing, and managing flight paths for UAVs. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for a flight path from a first location to a second location in a particular region, and credentials of UAVs provided in a pool of UAVs (block 405). For example, UAV platform 230 may receive, from user device 210, a request for a flight path from a first location to a second location in a particular region, and credentials associated with UAVs 220 provided in a pool of UAVs 220. In some implementations, the pool of UAVs 220 may be associated with UAV platform 230 and/or user(s) associated with user device 210. For example, user device 210 and the pool of UAVs 220 may be owned and/or operated by a delivery company. In some implementations, the request for the flight path may include a request for flight path instructions from an origination location (e.g., a current location of the pool of UAVs 220) to a destination location (e.g., a location in the particular region). The origination location and the destination location may be provided in the particular region. In some implementations, the credentials of UAVs 220 in the pool may include identification numbers, model numbers, serial numbers, identifiers of UICCs (or other types of smart cards), government registration numbers, etc. associated with UAVs 220 in the pool. In some implementations, the credentials of UAVs 220 in the pool may include information identifying components of UAVs 220 (e.g., serial numbers, model numbers, part numbers, etc. of the components).

As further shown in FIG. 4A, process 400 may include determining whether the UAVs in the pool are authenticated for network(s) and are registered with an appropriate authority based on the UAV credentials (block 410). For example, UAV platform 230 may determine whether UAVs 220 in the pool are authenticated for using UAV platform 230 and/or one or more of networks 240-260 based on the credentials of UAVs 220 in the pool. In some implementations, UAV platform 230 may compare the credentials of UAVs 220 in the pool with UAV account information stored in data storage 235 (e.g., information associated with authenticated and registered UAVs 220, such as identification numbers of UAVs 220, public and/or private keys of UAVs 220, account status information, etc.) in order to determine whether UAVs 220 in the pool are authenticated for using UAV platform 230 and/or one or more of networks 240-260. For example, if the credentials of UAVs 220 in the pool include serial numbers of UAVs 220, UAV platform 230 may compare the serial numbers to the UAV account information in data storage 235 to determine whether UAVs 220 in the pool are registered with UAV platform 230, whether accounts of UAVs 220 in the pool are in good standing (e.g., paid for), etc. In some implementations, UAV platform 230 may determine whether UAVs 220 in the pool are authenticated for using UAV platform 230 and/or one or more of networks 240-260 based on, for example, UICCs associated with UAVs 220 in the pool.

In some implementations, UAV platform 230 may determine whether UAVs 220 in the pool are registered with an appropriate authority (e.g., a government agency) based on the credentials of UAVs 220 in the pool. For example, if the credentials of UAVs 220 in the pool include government registration numbers of UAVs 220, UAV platform 230 may compare the government registration numbers to the UAV account information in data storage 235 to determine whether UAVs 220 in the pool are registered with a government agency to legally fly in airspace regulated by the government agency. In some implementations, UAVs 220 in the pool may include a common protocol with other UAVs 220. The common protocol may enable UAVs 220 in the pool to be authenticated for using UAV platform 230 and/or one or more of networks 240-260, to communicate with the other UAVs 220, and/or to be verified as being registered with an appropriate authority. For example, if a particular UAV 220 is flying in an area where the particular UAV 220 loses communication with wireless network 240, the particular UAV 220 may establish communications with other UAVs 220 located near the particular UAV 220 (e.g., via the common protocol). The other UAVs 220 may share information (e.g., received from wireless one or more of networks 240-260) with the particular UAV 220 via the communications.

As further shown in FIG. 4A, if none of the UAVs in the pool are authenticated for the network(s) and/or are registered with an appropriate authority (block 410—NO), process 400 may include denying the request for the flight path (block 415). For example, if UAV platform 230 determines that UAVs 220 in the pool are not authenticated for using UAV platform 230 and/or one or more of networks 240-260 based on the credentials of UAVs 220 in the pool, UAV platform 230 may deny the request for the flight path. In some implementations, UAV platform 230 may provide, to user device 210, a notification indicating that the request for the flight path is denied due to UAVs 220 in the pool not being authenticated for using UAV platform 230 and/or one or more of networks 240-260. In some implementations, UAV platform 230 may determine that UAVs 220 in the pool are not authenticated for using UAV platform 230 and/or one or more of networks 240-260 when UAVs 220 in the pool are not registered with UAV platform 230, accounts of UAVs 220 in the pool are not in good standing, etc.

Alternatively, or additionally, if UAV platform 230 determines that UAVs 220 in the pool are not registered with an appropriate authority based on the credentials of UAVs 220 in the pool, UAV platform 230 may deny the request for the flight path. In some implementations, UAV platform 230 may provide, to user device 210, a notification indicating that the request for the flight path is denied due to UAVs 220 in the pool not being registered with an appropriate authority. In some implementations, UAV platform 230 may determine that UAVs 220 in the pool are not registered with an appropriate authority when user device 210 fails to provide government registration numbers via the credentials of UAVs 220 in the pool.

As further shown in FIG. 4A, if one or more of the UAVs in the pool is/are authenticated for the network(s) and is/are registered with an appropriate authority (block 410—YES), process 400 may include calculating a most efficient flight path from the first location to the second location based on other information (block 420). For example, if UAV platform 230 determines, based on the credentials of UAVs 220 in the pool, that one or more UAVs 220 in the pool are authenticated for using UAV platform 230 and/or one or more of networks 240-260, and are registered with an appropriate authority, UAV platform 230 may calculate a most efficient flight path from the origination location to the destination location based on other information. In some implementations, UAV platform 230 may determine that UAVs 220 in the pool are authenticated for using UAV platform 230 and/or one or more of networks 240-260 when UAVs 220 in the pool are registered with UAV platform 230, accounts of UAVs 220 are in good standing, etc. In some implementations, UAV platform 230 may determine that UAVs 220 in the pool are registered with an appropriate authority when UAVs 220 in the pool have government registration numbers that match government registration numbers provided in data storage 235.

In some implementations, UAV platform 230 may calculate the most efficient flight path from the origination location to the destination location based on other information, such as the weather information, the air traffic information, the obstacle information, the regulatory information, and/or the historical information stored in UAV platform 230 and/or data storage 235. In some implementations, UAV platform 230 may determine whether the other information indicates that UAVs 220 in the pool may safely complete the most efficient flight path from the origination location to the destination location without stopping. If UAV platform 230 determines that UAVs 220 in the pool cannot safely complete the most efficient flight path from the origination location to the destination location without stopping (e.g., to recharge or refuel), UAV platform 230 may determine one or more waypoints along the most efficient flight path for stopping and recharging or refueling.

In some implementations, UAV platform 230 may calculate the most efficient flight path based on a time it takes to travel from the origination location to the destination location. For example, assume that, based on the other information (e.g., the weather information, the air traffic information, the obstacle information, the regulatory information, and/or the historical information), UAV platform 230 calculates three flight paths that include flight times of two hours, three hours, and five hours, respectively. In such an example, UAV platform 230 may select, as the most efficient flight path, the flight path with the flight time of two hours (e.g., since the flight path requires the shortest amount of flight time).

Additionally, or alternatively, UAV platform 230 may calculate the most efficient flight path based on a distance required to travel from the origination location to the destination location. For example, assume that, based on the other information (e.g., the weather information, the air traffic information, the obstacle information, the regulatory information, and/or the historical information), UAV platform 230 calculates four flight paths that include distances of fifty kilometers, twenty kilometers, thirty kilometers, and sixty kilometers, respectively. In such an example, UAV platform 230 may select, as the most efficient flight path, the flight path with the distance of twenty kilometers (e.g., since the flight path requires the shortest distance).

Additionally, or alternatively, UAV platform 230 may calculate the most efficient flight path based on power required to travel from the origination location to the destination location. For example, assume that, based on the other information (e.g., the weather information, the air traffic information, the obstacle information, the regulatory information, and/or the historical information), UAV platform 230 calculates three flight paths that include power requirements of two hours of battery life, three hours of battery life, and one hour of battery life, respectively. In such an example, UAV platform 230 may select, as the most efficient flight path, the flight path with the power requirement of one hour of battery life (e.g., since the flight path requires the smallest amount of battery life).

Additionally, or alternatively, UAV platform 230 may calculate the most efficient flight path based on the weather information. For example, UAV platform 230 may determine that, without weather issues, the most efficient flight path may take any UAV 220 two hours to complete at an altitude of five-hundred meters. UAV platform 230 may further determine that wind conditions at five-hundred meters may create a headwind of fifty kilometers per hour on any UAV 220, but that wind conditions at one-thousand meters may create a tailwind of fifty kilometers per hour on any UAV 220. In such an example, UAV platform 230 may alter the most efficient flight path from an altitude of five-hundred meters to an altitude of one-thousand meters (e.g., if any UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the most efficient flight path, but the headwind at the altitude of five-hundred meters may increase the flight time from two hours to two hours and thirty minutes. UAV platform 230 may then determine whether any UAV 220 is capable of flying the extra thirty minutes in the headwind (e.g., whether any UAV 220 has adequate battery life or fuel).

Additionally, or alternatively, UAV platform 230 may calculate the most efficient flight path based on the air traffic information. For example, UAV platform 230 may determine that, without air traffic issues, the most efficient flight path may take any UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the most efficient flight path from an altitude of five-hundred meters to an altitude of one-thousand meters. The altitude of one-thousand meters may enable any UAV 220 to safely arrive at the location without the possibility of colliding with the other UAVs 220. Alternatively, UAV platform 230 may not alter the most efficient flight path, but the other UAVs 220 flying at the altitude of five-hundred meters may increase the possibility that any UAV 220 may collide with another UAV 220. UAV platform 230 may then determine whether any UAV 220 is capable of safely flying at the altitude of five-hundred meters without colliding with another UAV 220.

Additionally, or alternatively, UAV platform 230 may calculate the most efficient flight path based on the obstacle information. For example, UAV platform 230 may determine that, without obstacle issues, the most efficient flight path may take any UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the most efficient flight path from an altitude of two-hundred meters to an altitude of three-hundred meters. The altitude of three-hundred meters may enable any UAV 220 to safely arrive at the location without the possibility of colliding with the one or more buildings. Alternatively, UAV platform 230 may not alter the altitude of the most efficient flight path, but may change the most efficient flight path to avoid the one or more buildings, which may increase the flight time from one hour to one hour and thirty minutes. UAV platform 230 may then determine whether any UAV 220 is capable of flying the extra thirty minutes.

Additionally, or alternatively, UAV platform 230 may calculate the most efficient flight path based on the regulatory information. For example, UAV platform 230 may determine that, without regulatory issues, the most efficient flight path may take any UAV 220 one hour to complete at an altitude of five-hundred meters. UAV platform 230 may further determine that the most efficient flight path travels over a restricted facility based on the regulatory information. In such an example, UAV platform 230 may change the most efficient flight path to avoid flying over the restricted facility, which may increase the flight time from one hour to one hour and thirty minutes. UAV platform 230 may then determine whether any UAV 220 is capable of flying the extra thirty minutes.

Additionally, or alternatively, UAV platform 230 may calculate the most efficient flight path based on the historical information. For example, UAV platform 230 may identify prior flight paths from the origination location to the destination location from the historical information, and may select one of the prior flight paths, as the most efficient flight path. For example, assume that UAV platform 230 identifies three prior flight paths that include flight times of two hours, three hours, and four hours, respectively. In such an example, UAV platform 230 may select, as the most efficient flight path, the prior flight path with the flight time of two hours.

In some implementations, a user associated with user device 210 and/or the pool of UAVs 220 may pay more in order to utilize a preferred flight path, such as the most efficient flight path. For example, UAV platform 230 may designate particular flight paths between origination locations and destination locations as being preferred flight paths (e.g., due to being the shortest distance flight paths, the shortest time flight paths, etc.). In such an example, UAV platform 230 may charge a higher price for the preferred flight paths than charged for other flight paths between the origination locations and the destination locations.

In some implementations, UAV platform 230 may assign weights (e.g., values, percentages, etc.) to different factors to be used to calculate the most efficient flight path, such as the travel time, the travel distance, the power needed, the weather information, the air traffic information, the obstacle information, the regulatory information, the historical information, etc. UAV platform 230 may determine multiple flight paths between the origination location and the destination location based on the factors and the assigned weights. In some implementations, UAV platform 230 may calculate a score for each of the flight paths based on the factors and the assigned weights. In some implementations, UAV platform 230 may rank the flight paths based on the scores (e.g., in ascending order, descending order, etc.), and may select the most efficient flight path based on the ranked flight paths. For example, assume that UAV platform 230 assigns a weight of 0.3 to the travel time, a weight of 0.9 to the travel distance, a weight of 0.4 to the power needed, a weight of 0.1 to the weather information, a weight of 0.2 to the air traffic information, a weight of 0.5 to the obstacle information, a weight of 0.3 to the regulatory information, and a weight of 0.1 to the historical information. Further, assume that UAV platform 230 determines three flight paths (e.g., A, B, and C) between the origination location and the destination location based on the assigned weights, and calculates a score of 0.8 for flight path A, a score of 0.6 for flight path B, and a score of 0.7 for flight path C. UAV platform 230 may rank the flight paths based on the scores (e.g., as A, C, and B), and may select flight path A as the most efficient flight path based on the ranking (e.g., since flight path A has the greatest score).

As further shown in FIG. 4A, process 400 may include receiving component information associated with UAVs in the pool that are determined to be authenticated and registered (block 425). For example, UAV platform 230 may receive component information associated with particular UAVs 220 in the pool that are determined to be authenticated for using UAV platform 230 and/or one or more of networks 240-260, and registered with an appropriate authority. In some implementations, UAV platform 230 may request the component information from user device 210 and/or the authenticated/registered UAVs 220 in the pool, and user device 210 and/or the authenticated/registered UAVs 220 in the pool may provide the component information to UAV platform 230 based on the request. In some implementations, user device 210 may provide the component information to UAV platform 230 with the request for the flight path. In some implementations, UAV platform 230 may retrieve the component information from data storage 235 based on the credentials of UAVs 220 in the pool. The component information may include information describing components of the authenticated/registered UAVs 220 in the pool, such as identifiers (e.g., serial numbers, model numbers, etc.) of the components, information identifying particular types of batteries, engines, rotors, etc. of the authenticated/registered UAVs 220 in the pool, etc.

As further shown in FIG. 4A, process 400 may include determining capability information for the authenticated/registered UAVs based on the component information of the authenticated/registered UAVs (block 430). For example, UAV platform 230 may receive capability information for the authenticated/registered UAVs 220 in the pool based on the component information of the authenticated/registered UAVs 220 in the pool. In some implementations, UAV platform 230 may determine capability information for the authenticated/registered UAVs 220 in the pool based on the request for the flight path and the component information of the UAVs 220 in the pool (e.g., provided with the request for the flight path). For example, data storage 235 may include capability information associated with different components of UAVs 220, such as battery life, thrusts provided by rotors, flight times associated with amounts of fuel, etc. In some implementations, UAV platform 230 may utilize the component information of the authenticated/registered UAVs 220 in the pool (e.g., indicated that the authenticated/registered UAVs 220 in the pool have particular types of batteries, engines, rotors, etc.) to retrieve the capability information for components of the authenticated/registered UAVs 220 in the pool from data storage 235. For example, if an authenticated/registered UAV 220 has a particular type of battery and a particular type of rotor, UAV platform 230 may determine that the particular type of battery of the authenticated/registered UAV 220 may provide two hours of flight time and that the particular type of rotor may enable the authenticated/registered UAV 220 to reach an altitude of one-thousand meters.

As further shown in FIG. 4A, process 400 may include selecting a particular UAV, from the authenticated/registered UAVs, that is capable of traversing the most efficient flight path based on the capability information (block 435). For example, UAV platform 230 may select a particular UAV 220, from the authenticated/registered UAVs 220 in the pool, that is capable of traversing the most efficient flight path based on the capability information associated with the authenticated/registered UAVs 220 in the pool and/or the other information (e.g., the weather information, the air traffic information, the obstacle information, the regulatory information, and/or the historical information) stored in UAV platform 230 and/or data storage 235.

In some implementations, UAV platform 230 may determine that a particular UAV 220, from the authenticated/registered UAVs 220 in the pool, is capable of traversing the most efficient flight path when the particular UAV 220 is capable of flying a distance associated with the most efficient flight path, in weather conditions (e.g., specified by the weather information), without colliding with air traffic and/or obstacles (e.g., specified by the air traffic information and the obstacle information), and without violating any regulations (e.g., specified by the regulatory information). In some implementations, UAV platform 230 may determine that multiple UAVs 220, from the authenticated/registered UAVs 220 in the pool, are capable of traversing the most efficient flight path, and may select, as the particular UAV 220, one of the multiple UAVs 220 that is capable of traversing the most efficient flight path in the most efficient manner (e.g., in a shortest distance, in a shortest amount of time, using the least amount of resources, etc.).

In some implementations, UAV platform 230 may assign different weights to different capability information associated with the multiple UAVs 220 that are capable of traversing the most efficient flight path. In some implementations, UAV platform 230 may calculate a score for each of the multiple UAVs 220 based on the capability information and the assigned weights. In some implementations, UAV platform 230 may rank the multiple UAVs 220 based on the scores (e.g., in ascending order, descending order, etc.), and may select a particular UAV 220, from the multiple UAVs 220, based on the ranked UAVs 220. For example, assume that UAV platform 230 assigns a weight of 0.1 to battery lives of the multiple UAVs 220, a weight of 0.2 to rotor thrusts of the multiple UAVs 220, and a weight of 0.5 to the sense and avoid capabilities of the multiple UAVs 220. Further, assume that UAV platform 230 calculates a score of 0.4 for a first UAV 220 of the multiple UAVs 220, a score of 0.7 for a second UAV 220 of the multiple UAVs 220, and a score of 0.5 for a third UAV 220 of the multiple UAVs 220. UAV platform 230 may rank the multiple UAVs 220 based on the scores (e.g., as (1) the second UAV 220, (2) the third UAV 220, and (3) the first UAV 220), and may select the second UAV 220 as the particular UAV 220 to traverse the most efficient flight path based on the ranking (e.g., since the second UAV 220 has the greatest score).

In some implementations, UAV platform 230 may determine that none of the authenticated/registered UAVs 220 in the pool are capable of traversing the most efficient flight path when the authenticated/registered UAVs 220 in the pool are not capable of flying a distance associated with the most efficient flight path, the weather conditions are too extreme for the authenticated/registered UAVs 220 in the pool (e.g., specified by the weather information), the authenticated/registered UAVs 220 in the pool may collide with air traffic and/or an obstacle (e.g., specified by the air traffic information and the obstacle information), or the authenticated/registered UAVs 220 in the pool may violate any regulations (e.g., specified by the regulatory information).

As further shown in FIG. 4A, if none of the authenticated/registered UAVs in the pool are selected for traversing the most efficient flight path (block 435—NO), process 400 may include recalculating the most efficient flight path from the first location to the second location based on the other information (block 420). For example, if UAV platform 230 determines that none of the authenticated/registered UAVs 220 in the pool are capable of traversing the most efficient flight path, UAV platform 230 may recalculate the most efficient flight path from the origination location to the destination location based on other information, or may include waypoint(s) (e.g., for recharging) in the most efficient flight path. In some implementations, UAV platform 230 may determine that the authenticated/registered UAVs 220 in the pool are not capable of traversing the most efficient flight path when the authenticated/registered UAVs 220 in the pool are not capable of flying a distance associated with the most efficient flight path, the weather conditions are too extreme for the authenticated/registered UAVs 220 in the pool, the authenticated/registered UAVs 220 in the pool may collide with air traffic and/or an obstacle, or the authenticated/registered UAVs 220 in the pool may violate any regulations. In some implementations, UAV platform 230 may deny the request for the flight path if UAV platform 230 determines that none of the authenticated/registered UAVs 220 in the pool are capable of traversing the most efficient flight path.

In some implementations, UAV platform 230 may recalculate the most efficient flight path from the origination location to the destination location in the manner described above in connection with process block 420. However, the recalculated most efficient flight path may be less efficient than the originally calculated most efficient flight path. For example, assume that UAV platform 230 calculates flight paths that include flight distances of five kilometers, seven kilometers, and ten kilometers. In such an example, UAV platform 230 may select, as the most efficient flight path, the flight path with the flight distance of five kilometers (e.g., since the flight path requires the shortest distance). However, if none of the authenticated/registered UAVs 220 in the pool are capable of traversing the five kilometer flight path (e.g., due to obstacles associated with the flight path), UAV platform 230 may select, as the next most efficient flight path, the flight path with the flight distance of seven kilometers (e.g., since the flight path requires the next shortest distance, does not include the obstacles, and includes several possibilities for waypoints for refueling/recharging).

As shown in FIGS. 4A and 4B, if a particular UAV, of the authenticated/registered UAVs in the pool, is selected for traversing the most efficient flight path (block 435—YES), process 400 may include generating flight path instructions for the most efficient flight path (block 440). For example, if UAV platform 230 determines that the particular UAV, of the authenticated/registered UAVs in the pool, is capable of traversing the most efficient flight path based on the capability information associated with the particular UAV 220 and/or the other information, UAV platform 230 may generate flight path instructions for the most efficient flight path. In some implementations, UAV platform 230 may determine that the particular UAV 220 is capable of traversing the most efficient flight path when the particular UAV 220 is capable of flying a distance associated with the most efficient flight path, in the weather conditions, without colliding with air traffic and/or obstacles, and without violating any regulations.

In some implementations, the flight path instructions may include specific altitudes for the particular UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where the particular UAV 220 may stop and recharge or refuel); etc. For example, the flight path instructions may include information that instructs the particular UAV 220 to fly forty-five degrees northeast for ten kilometers and at an altitude of five-hundred meters, then fly three-hundred and fifteen degrees northwest for ten kilometers and at an altitude of four-hundred meters, etc.

As further shown in FIG. 4B, process 400 may include providing the flight path instructions to the particular UAV (block 445). For example, UAV platform 230 may provide the flight path instructions to the particular UAV 220. In some implementations, the particular UAV 220 may utilize the flight path instructions to travel via the most efficient flight path. For example, the particular UAV 220 may take off at a time specified by the flight path instructions, may travel a route and at altitudes specified by the flight path instructions, may detect and avoid any obstacles encountered in the most efficient flight path, etc. until the particular UAV 220 arrives at the destination location.

In some implementations, if the particular UAV 220 includes sufficient computational resources (e.g., a sufficient degree of autonomy), the particular UAV 220 may utilize information provided by the flight path instructions to calculate a flight path for the particular UAV 220 and to generate flight path instructions. In such implementations, the flight path instructions provided by UAV platform 230 may include less detailed information, and the particular UAV 220 may determine more detailed flight path instructions via the computational resources of the particular UAV 220.

As further shown in FIG. 4B, process 400 may include receiving feedback from the particular UAV, via network(s), during traversal of the most efficient flight path by the particular UAV (block 450). For example, while the particular UAV 220 is traveling along the most efficient flight path in accordance with the flight path instructions, the particular UAV 220 may provide feedback to UAV platform 230 via one or more of networks 240-260, and UAV platform 230 may receive the feedback. In some implementations, the feedback may include information received by sensors of the particular UAV 220, such as visual information received from electromagnetic spectrum sensors of the particular UAV 220 (e.g., images of obstacles), temperature information, wind conditions, etc. In some implementations, the particular UAV 220 may utilize such feedback to detect and avoid any unexpected obstacles encountered by the particular UAV 220 during traversal of the flight path. For example, if the particular UAV 220 detects another UAV 220 in the most efficient flight path, the particular UAV 220 may alter the most efficient flight path to avoid colliding with the other UAV 220.

As further shown in FIG. 4B, process 400 may include determining whether to modify the most efficient flight path based on the feedback from the UAV (block 455). For example, UAV platform 230 may determine whether to modify the most efficient flight path based on the feedback received from the particular UAV 220. In some implementations, UAV platform 230 may determine to not modify the most efficient flight path if the feedback indicates that the particular UAV 220 will safely arrive at the destination location. In some implementations, UAV platform 230 may determine to modify the most efficient flight path if the feedback indicates that the particular UAV 220 is in danger of colliding with an obstacle (e.g., another UAV 220, a building, an airplane, etc.). In such implementations, UAV platform 230 may modify the most efficient flight path so that the particular UAV 220 avoids colliding with the obstacle and/or remains a safe distance from the obstacle.

In some implementations, UAV platform 230 may determine to modify the most efficient flight path if the feedback indicates that the weather conditions may prevent the particular UAV 220 from reaching the destination location. For example, the wind conditions may change and cause the flight time of the particular UAV 220 to increase to a point where the battery of the particular UAV 220 will be depleted before the particular UAV 220 reaches the destination location. In such an example, UAV platform 230 may modify the most efficient flight path so that the particular UAV 220 either stops to recharge or changes altitude to improve wind conditions. In another example, rain or ice may increase the weight of the particular UAV 220 and/or its payload and may cause the battery of the particular UAV 220 to work harder to a point where the battery of the particular UAV 220 will be depleted before the particular UAV 220 reaches the destination location. In such an example, UAV platform 230 may modify the most efficient flight path so that the particular UAV 220 stops to recharge before completing the flight path.

As further shown in FIG. 4B, if the most efficient flight path is to be modified (block 455—YES), process 400 may include generating modified flight path instructions based on the feedback (block 460). For example, if UAV platform 230 determines that the most efficient flight path is be modified, UAV platform 230 may modify the most efficient flight path based on the feedback (e.g., as described above). In some implementations, UAV platform 230 may generate modified flight path instructions for the modified flight path based on the feedback. In some implementations, the modified flight path instructions may include the features of flight path instructions, but may be modified based on the feedback. For example, the flight path instructions may be modified so that the particular UAV 220 avoids colliding with an obstacle and/or remains a safe distance from the obstacle, stops to recharge, changes altitude to improve wind conditions, etc.

As further shown in FIG. 4B, process 400 may include providing the modified flight path instructions to the particular UAV (block 465). For example, UAV platform 230 may provide the modified flight path instructions to the particular UAV 220. In some implementations, the particular UAV 220 may utilize the modified flight path instructions to travel along the modified flight path. For example, the particular UAV 220 may adjust a route and altitudes according to the modified flight path instructions, may detect and avoid any obstacles encountered in the modified flight path, etc. until the particular UAV 220 arrives at the destination location. In some implementations, the particular UAV 220 may continue to provide further feedback to UAV platform 230 during traversal of the modified flight path, and UAV platform 230 may or may not further modify the flight path based on the further feedback.

As further shown in FIG. 4B, if the most efficient flight path is not to be modified (block 455—NO), process 400 may include receiving a notification that the particular UAV arrived at the second location (block 470). For example, if the feedback indicates that the particular UAV 220 will safely arrive at the destination location, UAV platform 230 may determine that the most efficient flight path need not be modified. In some implementations, the particular UAV 220 may continue along the most efficient flight path based on the flight path instructions until the particular UAV 220 arrives at the destination location. When the particular UAV 220 arrives at the destination location, the particular UAV 220 may provide a notification to UAV platform 230, via one or more of networks 240-260. In some implementations, the notification may indicate that the particular UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
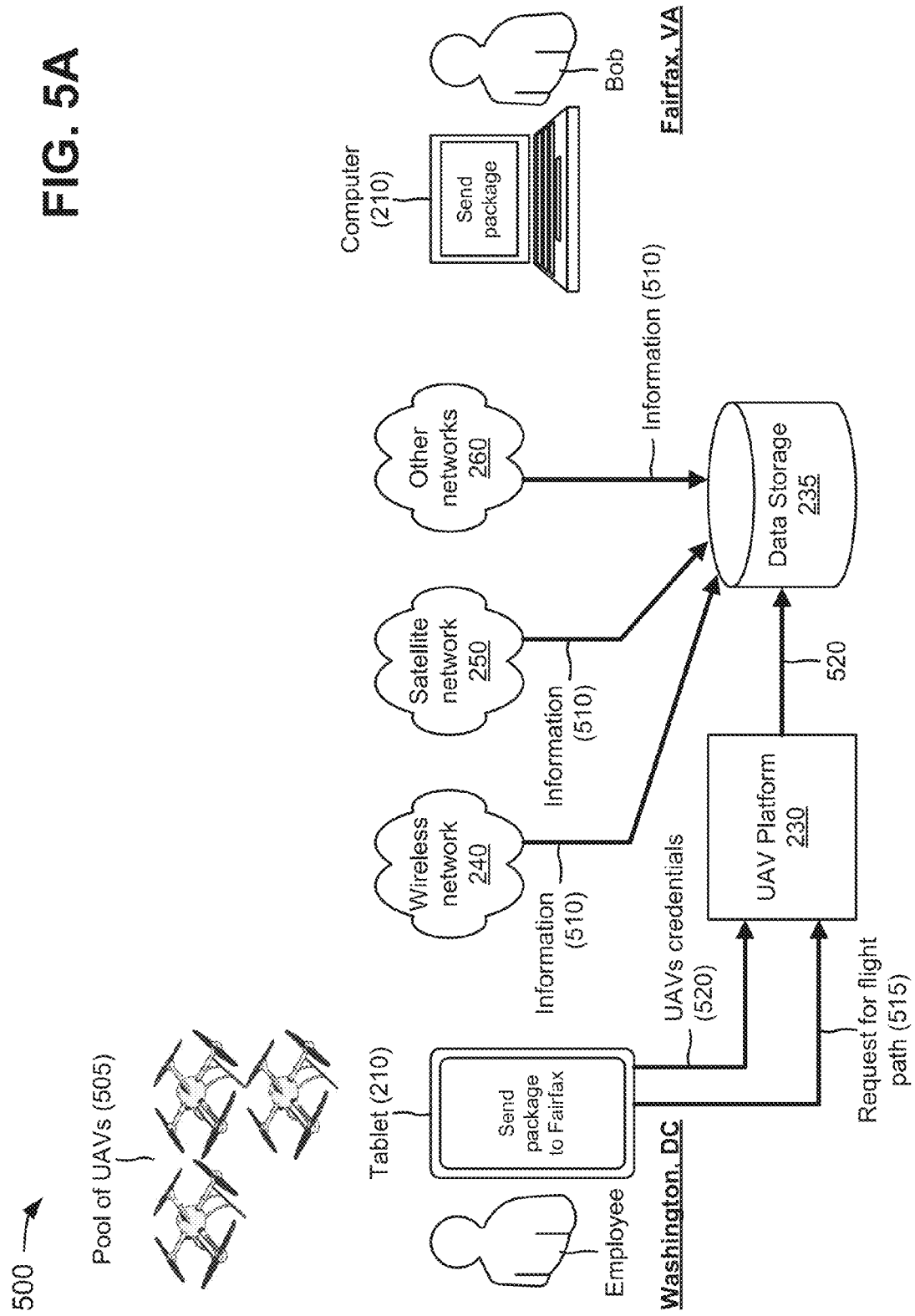
FIGS. 5A-5D are diagrams of an example relating to the example process shown in FIGS. 4A and 4B.

FIGS. 5A-5D are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize one UAV 220, from a pool 505 of UAVs 220, to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. Wireless network 240, satellite network 250, and/or other networks 260 may provide, to data storage 235, information 510, such as capability information associated with UAVs 220 in pool 505, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 to generate a request 515 for a flight path (e.g., from Washington, D.C. to Fairfax, Va.) for one of UAVs 220 in pool 505, and to provide request 515 to UAV platform 230. Request 515 may include credentials 520 (e.g., serial numbers, identifiers of UICCs, etc.) associated with UAVs 220 in pool 505, or credentials 520 may be provided separately from request 515 to UAV platform 230. UAV platform 230 may utilize credentials 520 to determine whether one or more UAVs 220 in pool 505 are authenticated for utilizing UAV platform 230 and/or one or more of networks 240-260, and are registered with an appropriate authority for use. For example, UAV platform 230 may compare credentials 520 with information provided in data storage 235 in order to determine whether one or more UAVs 220 in pool 505 are authenticated for utilizing UAV platform 230 and/or one or more of networks 240-260, and are registered with an appropriate authority.

Figure 5B:
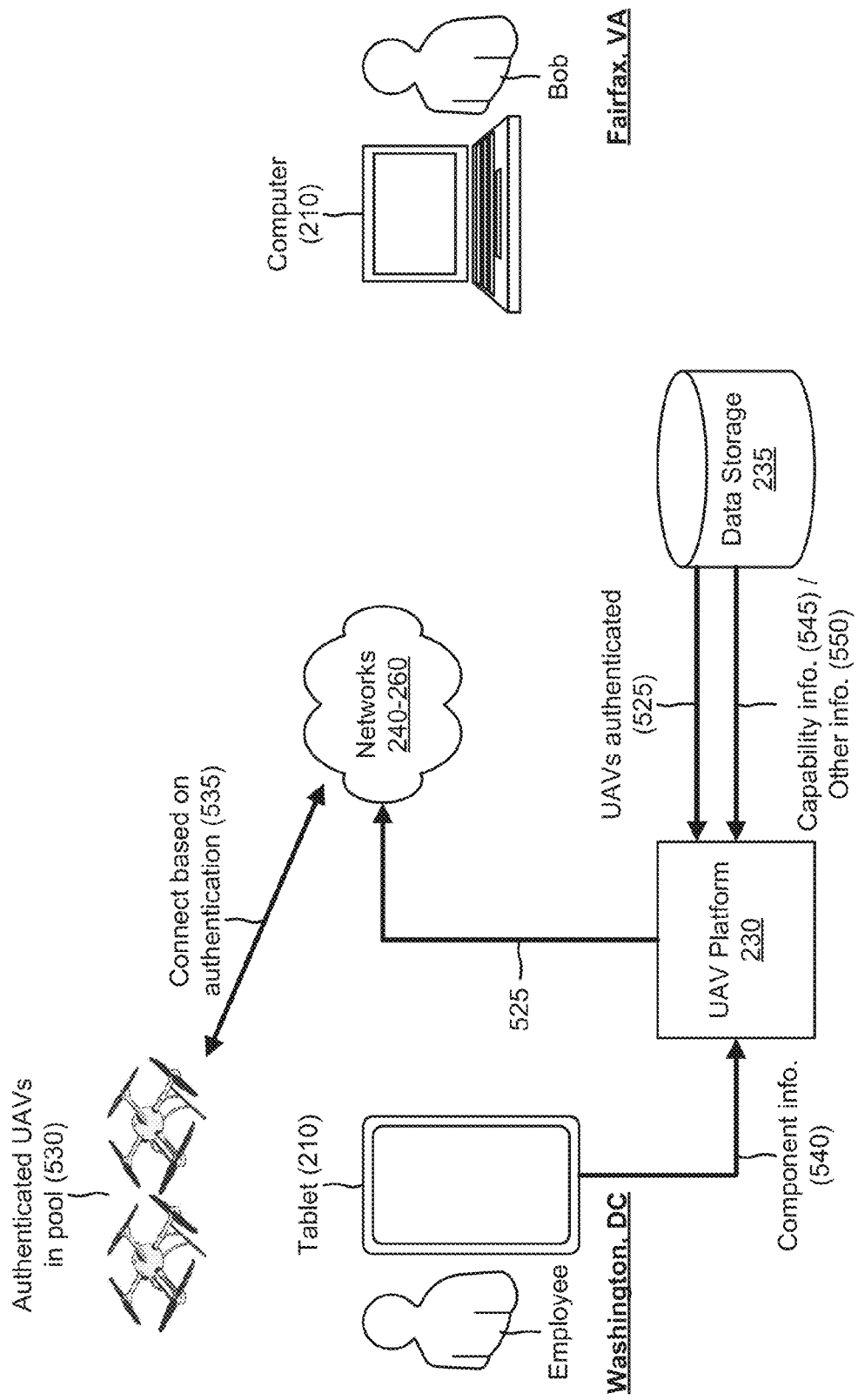

In some implementations, UAV platform 230 may compare credentials 520 with UAV account information, provided in data storage 235, to determine whether one or more UAVs 220 in pool 505 are authenticated for utilizing UAV platform 230 and/or one or more of networks 240-260, and are registered with an appropriate authority. As shown in FIG. 5B, assume that two UAVs 220 in pool 505 are authenticated and/or registered, as indicated by reference number 525, and that UAV platform 230 provides, to networks 240-260, a message 525 indicating that the two UAVs 220 in pool 505 are authenticated to use one or more of networks 240-260, as indicated by reference number 530. The two UAVs 220 may connect with one or more of networks 240-260 based on the authentication of the two UAVs 220, as indicated by reference number 535. As further shown in FIG. 5B, UAV platform 230 may receive component information 540 associated with the two UAVs 220, and may retrieve capability information 545, associated with the two UAVs 220, and other information 550 (e.g., weather information, air traffic information, obstacle information, regulatory information, and/or historical information) from data storage 235. In some implementations, UAV platform 230 may utilize component information 540 to identify capability information 545, and other information 550 in data storage 235.

UAV platform 230 may calculate a most efficient flight path from Washington, D.C. to Fairfax, Va. based on other information 550. For example, the weather information may indicate that the wind is ten kilometers per hour from the west and that it is raining; the air traffic information may indicate that a jet is at an altitude of ten-thousand meters and another UAV 220 is at an altitude of five-hundred meters; the obstacle information may indicate that a mountain is one-thousand meters in height and a building is five-hundred meters in height; the regulatory information may indicate that there is a no fly zone over a government building; and the historical information may indicate that a historical flight path had a duration of thirty minutes and an altitude of one-thousand meters. UAV platform 230 may assign weights to the travel time, the travel distance, the power required, the weather information, the air traffic information, the obstacle information, the regulatory information, the historical information, etc., and may determine multiple flight paths from Washington, D.C. to Fairfax, Va. based on the assigned weights. UAV platform 230 may calculate a score for each of the flight paths based on the assigned weights, may rank the flight paths based on the scores, and may select the most efficient flight path based on the ranked flight paths.

UAV platform 230 may select a particular UAV 220, from the two UAVs 220, that is capable of traversing the most efficient flight path, based on capability information 540. UAV platform 230 may assign different weights to different capability information 540 associated with the two UAVs 220, and may calculate a score for each of the two UAVs 220 based on the assigned weights. UAV platform 230 may rank the two UAVs 220 based on the scores, and may select the particular UAV 220, from the two UAVs 220, based on the ranking. Assume that UAV platform 230 selects a UAV 220 (e.g., referred to as selected UAV 555), of the two UAVs 220, as being capable of traversing the most efficient flight.

Figure 5C:
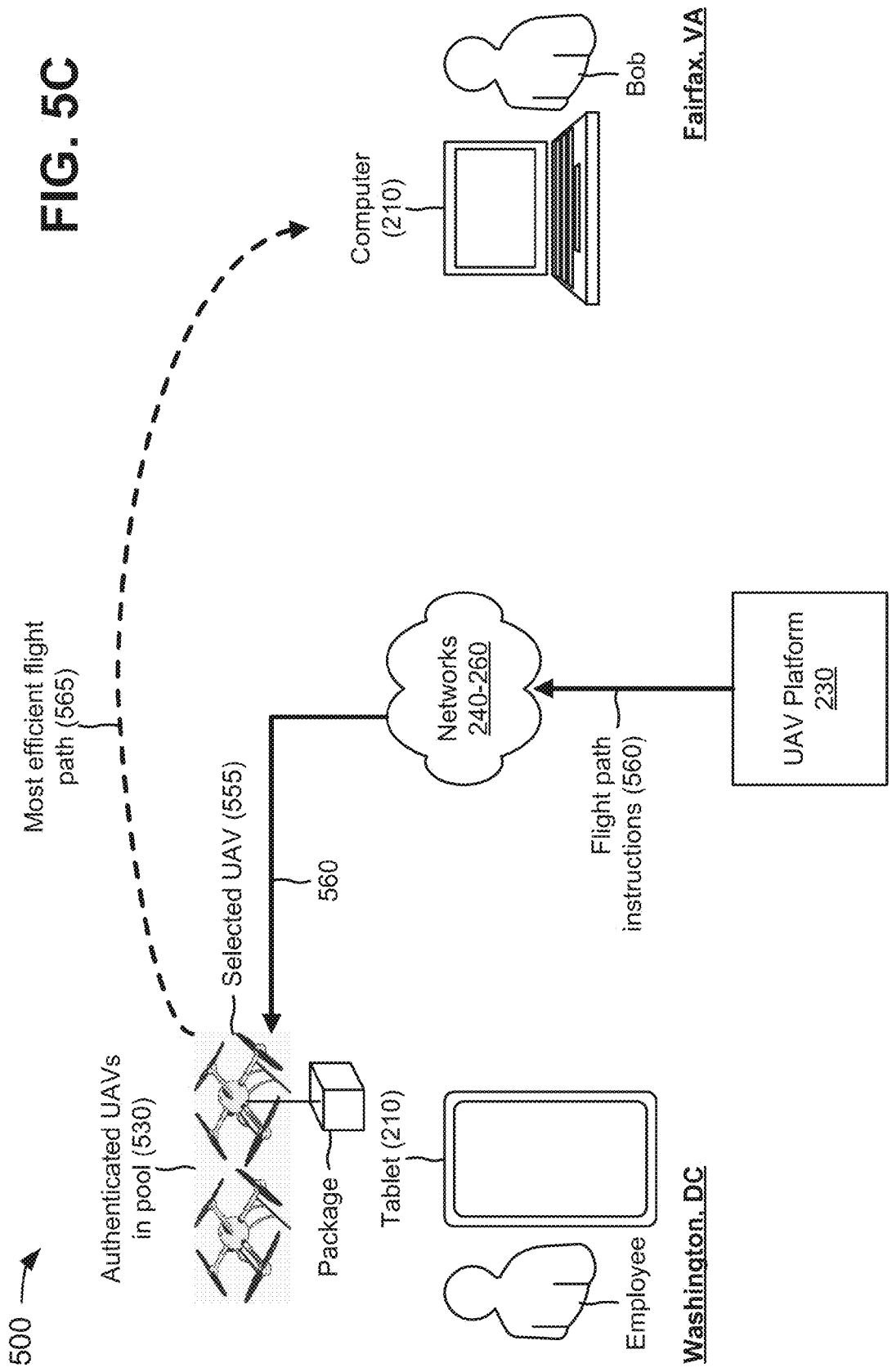

UAV platform 230 may generate flight path instructions 560 for the most efficient flight path. Flight path instructions 560 may include, for example, information instructing the selected UAV 555 to fly north at zero degrees for ten kilometers, then northeast at forty degrees for three kilometers, at an altitude of one-thousand meters, etc. As shown in FIG. 5C, UAV platform 230 may provide flight path instructions 560 to the selected UAV 555 via one or more of networks 240-260. The package may be attached to or provided in the selected UAV 555 (e.g., by the employee). The selected UAV 555 may take off from Washington, D.C. with the package, and may travel a most efficient flight path 565 based on flight path instructions 560. Most efficient flight path 565 may correspond to the most efficient flight path from Washington, D.C. to Fairfax, Va., as calculated by UAV platform 230, and may correspond to flight path instructions 560.

Figure 5D:
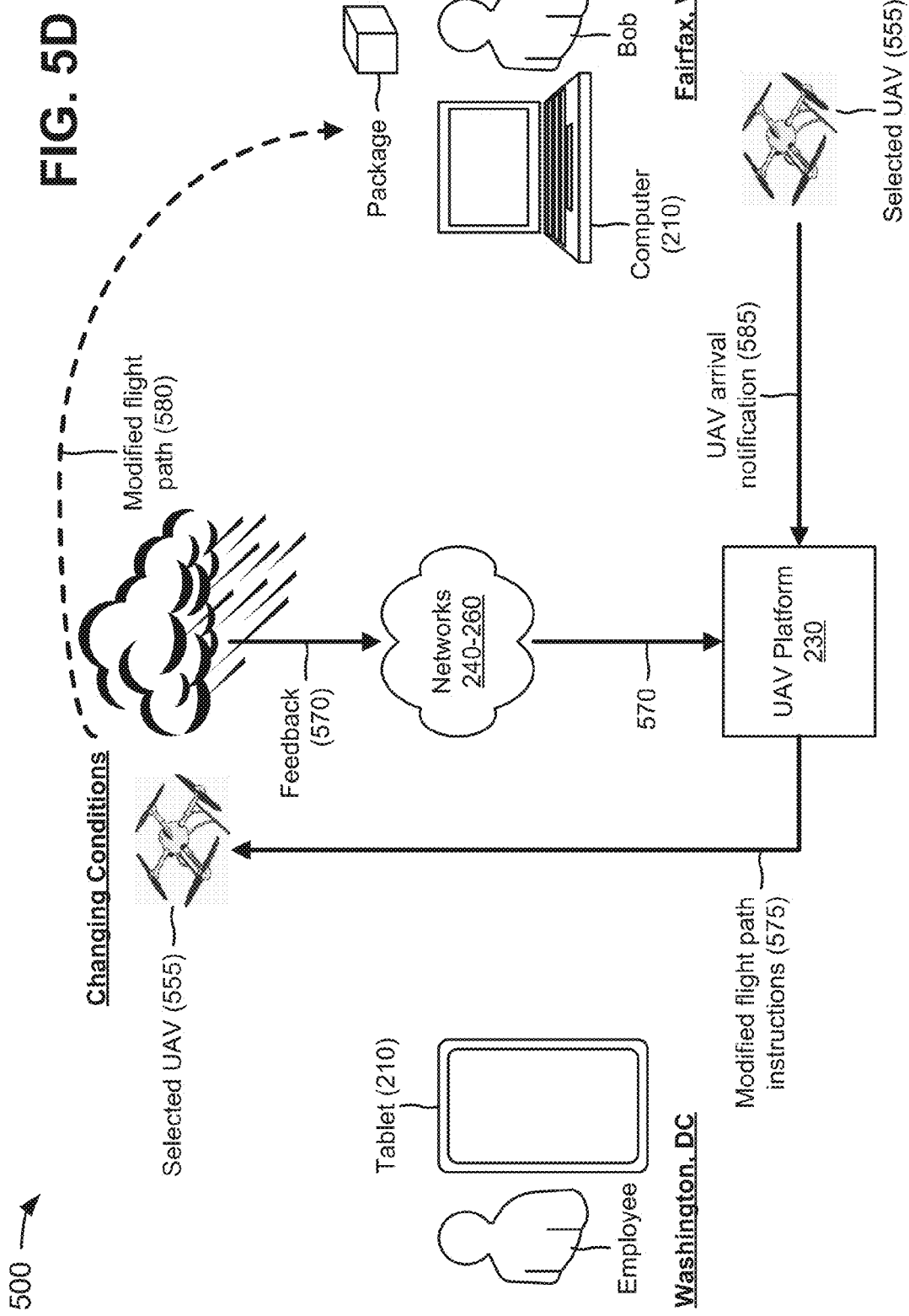

While the selected UAV 555 is traveling along most efficient flight path 565, one or more of networks 240-260 may receive feedback 570 from the selected UAV 555 regarding traversal of most efficient flight path 565 by the selected UAV 555 (e.g., changing conditions, such as speed, weather conditions, duration, etc.), as shown in FIG. 5D. Assume that the selected UAV 555 senses bad weather (e.g., heavy rain) along most efficient flight path 565, and provides information about the bad weather to UAV platform 230 (e.g., via feedback 570). UAV platform 230 and/or the selected UAV 555 may calculate a modified flight path that enables the selected UAV 555 to avoid and/or remain a safe distance from the bad weather. UAV platform 230 and/or the selected UAV 555 may generate modified flight path instructions 575 for a modified flight path 580. UAV platform 230 may provide modified flight path instructions 575 to selected UAV 555 (e.g., via one or more of networks 240-260), and the selected UAV 555 may travel modified flight path 580, based on modified flight path instructions 575, until the selected UAV 555 arrives at Fairfax, Va.

As further shown in FIG. 5D, when the selected UAV 555 arrives at Fairfax, Va., the selected UAV 555 may leave the package at a location where Bob may retrieve the package. The selected UAV 555 and/or computer 210 (e.g., via Bob's input or detection of the presence of the selected UAV 555) may generate a notification 585 indicating that the selected UAV 555 and the package arrived safely at a particular location in Fairfax, Va., and may provide notification 585 to UAV platform 230.

As indicated above, FIGS. 5A-5D are provided merely as an example. Other examples are possible and may differ from what was described with regard to FIGS. 5A-5D.

Systems and/or methods described herein may provide a platform that enables UAVs to safely traverse flight paths from origination locations to destination locations. The systems and/or methods may enable the platform to determine the most efficient flight paths from origination locations to destination locations, and to select the optimal UAVs to traverse the most efficient flight paths. The systems and/or methods may also provide assurance that UAVs successfully and safely traverse the most efficient flight paths.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device, a request for a flight path from a first geographical location to a second geographical location in a region,
the request including credentials associated with unmanned aerial vehicles in a group of unmanned aerial vehicles and component information associated with components of the unmanned aerial vehicles in the group;

determining, by the device and based on the credentials associated with the unmanned aerial vehicles in the group, whether one or more of the unmanned aerial vehicles in the group are authenticated for utilizing the device and a network associated with the device;

selecting, by the device and when one or more of the unmanned aerial vehicles in the group are authenticated for utilizing the device and the network, a flight path from the first geographical location to the second geographical location, and from a plurality of possible flight paths, based on one or more of weather information, air traffic information, obstacle information, or regulatory information associated with the region, travel time for the flight path, travel distance for the flight path, or power required for the flight path;

determining, by the device and based on the component information, capability information for the one or more unmanned aerial vehicles determined to be authenticated for utilizing the device and the network;

selecting, by the device and from the one or more unmanned aerial vehicles determined to be authenticated for utilizing the device and the network, a particular unmanned aerial vehicle that is capable of traversing the flight path based on the capability information, selecting the particular unmanned aerial vehicle comprising:

assigning weights to the capability information for the one or more unmanned aerial vehicles determined to be authenticated for utilizing the device and the network, calculating a score, for each of the one or more unmanned aerial vehicles determined to be authenticated for utilizing the device and the network, based on the assigned weights, and selecting the particular unmanned aerial vehicle, from the one or more unmanned aerial vehicles determined to be authenticated for utilizing the device and the network, based on the calculated scores;

generating, by the device, flight path instructions for the flight path; and providing, by the device, the flight path instructions to the particular unmanned aerial vehicle to permit the particular unmanned aerial vehicle to travel from the first geographical location to the second geographical location via the flight path.

2. The method of claim 1, where selecting the flight path comprises:

assigning weights to one or more of the weather information, the air traffic information, the obstacle information, or the regulatory information associated with the region, the travel time for the flight path, the travel distance for the flight path, or the power required for the flight path;

determining the plurality of possible flight paths from the first geographical location to the second geographical location;

calculating scores for the plurality of possible flights based on the assigned weights; and selecting the flight path, from plurality of possible flight paths, based on the calculated scores for the plurality of possible flight paths.

3. The method of claim 2, where calculating the flight path comprises:

ranking the plurality of possible flight paths based on the calculated scores for the plurality of possible flight paths; and selecting the flight path, from the plurality of possible flight paths, based on the ranking of the plurality of possible flight paths.

4. The method of claim 2, where different weights are assigned to one or more of the weather information, the air traffic information, the obstacle information, or the regulatory information associated with the region, the travel time for the flight path, the travel distance for the flight path, or the power required for the flight path.

5. The method of claim 1, where selecting the particular unmanned aerial vehicle comprises:

ranking the one or more unmanned aerial vehicles based on the calculated scores; and selecting the particular unmanned aerial vehicle, from the one or more unmanned aerial vehicles determined to be authenticated for utilizing the device and the network, based on the ranking of the one or more unmanned aerial vehicles.

6. The method of claim 1, where different weights are assigned to different types of the capability information.

7. A system, comprising:

a storage device to store one or more of:
 weather information associated with a region,
 air traffic information associated with the region,
 obstacle information associated with the region, or
 regulatory information associated with the region; and one or more devices to:
 receive a request for a flight path from a first geographical location to a second geographical location in a region,
  the request including component information associated with components of unmanned aerial vehicles in a group of unmanned aerial vehicles;
 select a flight path from the first geographical location to the second geographical location, and from a plurality of possible flight paths, based on one or more of the weather information, the air traffic information, the obstacle information, or the regulatory information associated with the region, travel time for the flight path, travel distance for the flight path, or power required for the flight path,
 where, when selecting the flight path, the one or more devices are to:
  assign weights to one or more of the weather information, the air traffic information, the obstacle information, or the regulatory information associated with the region, the travel time for the flight path, the travel distance for the flight path, or the power required for the flight path,
  determine the plurality of possible flight paths from the first geographical location to the second geographical location,
  calculate scores for the plurality of possible flights based on the assigned weights, and
  select the flight path, from the plurality of possible flight paths, based on the calculated scores;
 determine, based on the component information, capability information for the unmanned aerial vehicles in the group;

identify a plurality of unmanned aerial vehicles, in the group of unmanned aerial vehicle, that are capable of traversing the flight path, based on the capability information;

select, from the plurality of unmanned aerial vehicles, a particular unmanned aerial vehicle based on the capability information;

generate flight path instructions for the flight path; and provide the flight path instructions to the particular unmanned aerial vehicle to permit the particular unmanned aerial vehicle to travel from the first geographical location to the second geographical location via the flight path.

8. The system of claim 7, where, when selecting the flight path, the one or more devices are to:
rank the plurality of possible flight paths based on the calculated scores; and
select the flight path, from the plurality of possible flight paths, based on the ranking of the plurality of possible flight paths.

9. The system of claim 7, where different weights are assigned to one or more of the weather information, the air traffic information, the obstacle information, or the regulatory information associated with the region, the travel time for the flight path, the travel distance for the flight path, or the power required for the flight path.

10. The system of claim 7, where, when selecting the particular unmanned aerial vehicle, the one or more devices are to:
assign weights to the capability information for the plurality of unmanned aerial vehicles;
calculate a score, for each of the plurality of unmanned aerial vehicles, based on the assigned weights; and
select the particular unmanned aerial vehicle, from the plurality of unmanned aerial vehicles, based on the calculated scores for the plurality of unmanned aerial vehicles.

11. The system of claim 10, where, when selecting the particular unmanned aerial vehicle, the one or more devices are to:
rank the plurality of unmanned aerial vehicles based on the calculated scores for the plurality of unmanned aerial vehicles; and
select the particular unmanned aerial vehicle, from the plurality of unmanned aerial vehicles, based on the ranking of the plurality of unmanned aerial vehicles.

12. The system of claim 10, where different weights are assigned to different types of the capability information.

13. A non-transitory computer-readable medium for storing instructions, the instructions comprising:
one or more instructions that, when executed by one or more processors of a device, cause the one or more processors to:
receive a request for a flight path from a first geographical location to a second geographical location in a region,
the request including component information associated with components of unmanned aerial vehicles in a group of unmanned aerial vehicles;
select a flight path from the first geographical location to the second geographical location, and from a plurality of possible flight paths, based on one or more of weather information, air traffic information, obstacle information, or regulatory information associated with the region, travel time for the flight path, travel distance for the flight path, or power required for the flight path;
determine, based on the component information, capability information for the unmanned aerial vehicles in the group;
identify a plurality of unmanned aerial vehicles, in the group of unmanned aerial vehicle, that are capable of traversing the flight path, based on the capability information;
select, from the plurality of unmanned aerial vehicles, a particular unmanned aerial vehicle based on the capability information,
where the one or more instructions, that cause the one or more processors to select the particular unmanned aerial vehicle, comprise one or more instructions that, when executed by the one or more processors, cause the one or more processors to:
assign weights to the capability information for the plurality of unmanned aerial vehicles,
calculate a score, for each of the plurality of unmanned aerial vehicles, based on the assigned weights, and
select the particular unmanned aerial vehicle, from the plurality of unmanned aerial vehicles, based on the calculated scores;
generate flight path instructions for the flight path; and
provide the flight path instructions to the particular unmanned aerial vehicle to permit the particular unmanned aerial vehicle to travel from the first geographical location to the second geographical location via the flight path.

14. The non-transitory computer-readable medium of claim 13, where the one or more instructions, that cause the one or more processors to select the flight path, comprise:
one or more instructions that, when executed by the one or more processors, cause the one or more processors to:
assign weights to one or more of the weather information, the air traffic information, the obstacle information, or the regulatory information associated with the region, the travel time for the flight path, the travel distance for the flight path, or the power required for the flight path;
determine the plurality of possible flight paths from the first geographical location to the second geographical location;
calculate scores for the plurality of possible flights based on the assigned weights; and
select the flight path, from plurality of possible flight paths, based on the calculated scores for the plurality of possible flight paths.

15. The non-transitory computer-readable medium of claim 14, where the one or more instructions, that cause the one or more processors to select the flight path, comprise:
one or more instructions that, when executed by the one or more processors, cause the one or more processors to:
rank the plurality of possible flight paths based on the calculated scores for the plurality of possible flight paths; and
select the flight path, from the plurality of possible flight paths, based on the ranking of the plurality of possible flight paths.

16. The non-transitory computer-readable medium of claim 14, where different weights are assigned to one or more of the weather information, the air traffic information, the obstacle information, or the regulatory information associated with the region, the travel time for the flight path, the travel distance for the flight path, or the power required for the flight path.

17. The non-transitory computer-readable medium of claim 13, where the one or more instructions, that cause the one or more processors to select the particular unmanned aerial vehicle, comprise:
- one or more instructions that, when executed by the one or more processors, cause the one or more processors to:
  - rank the plurality of unmanned aerial vehicles based on the calculated scores; and
  - select the particular unmanned aerial vehicle, from the plurality of unmanned aerial vehicles, based on the ranking of the plurality of unmanned aerial vehicles.

18. The method of claim 1, further comprising:
- determining, based on the credentials associated with the unmanned aerial vehicles in the group, whether one or more of the unmanned aerial vehicles in the group are registered with an authority for use.

19. The system of claim 7, where the one or more devices are further to:
- determine, based on credentials associated with the unmanned aerial vehicles in the group, whether one or more of the unmanned aerial vehicles in the group are registered with an authority for use.

20. The non-transitory computer-readable medium of claim 13, where the instructions further comprise:
- one or more instructions that, when executed by the one or more processors, cause the one or more processors to:
  - determine, based on credentials associated with the unmanned aerial vehicles in the group, whether one or more of the unmanned aerial vehicles in the group are registered with an authority for use.

\* \* \* \* \*